United States Patent [19]
Tenney et al.
[11] Patent Number: 4,458,178
[45] Date of Patent: Jul. 3, 1984

[54] LOGIC CONTROLLED DEGAUSSING SYSTEM

[75] Inventors: David L. Tenney, Bolingbrook; James Kranse, Hanover Park; John R. Welk, Addison; all of Ill.

[73] Assignee: Motorola, Inc., Schaumburg, Ill.

[21] Appl. No.: 426,570

[22] Filed: Sep. 29, 1982

[51] Int. Cl.[3] ................ H04N 9/29
[52] U.S. Cl. ................ 315/8; 361/150
[58] Field of Search ................ 315/8, 85; 361/150, 361/267

[56] References Cited

U.S. PATENT DOCUMENTS 4,262,232 4/1981 Willis ................ 315/8

*Primary Examiner*—Eugene R. LaRoche
*Attorney, Agent, or Firm*—Margaret Marsh Parker; James W. Gillman

[57] ABSTRACT

A CRT in a CRT device is degaussed following a timed period of device inactivity and while the screen of the CRT is darkened, as well as at device turn-on or at manual activation. The screen stays darkened until data is inputted, and degaussing reoccurs during each subsequent timed period of inactivity.

11 Claims, 3 Drawing Figures

LOGIC CONTROLLED DEGAUSSING SYSTEM

CROSS REFERENCE TO RELATED APPLICATIONS

This application is related to a co-pending application, Ser. No. 426,574, filed as of even date and assigned to the same assignee.

BACKGROUND OF THE INVENTION

This invention relates to the field of cathode ray tube degaussing and, more particularly, logic control of degaussing under predetermined conditions.

It is well known in the art of CRT's having three electron beams for color reproduction that small amounts of magnetization in the metal parts of the tube can affect the purity of the colors. A very weak magnetic field near an electron beam can produce a deflection error sufficient to cause the beam to strike phosphor dots for which it was not intended. Many types of arrangements have been used in the manufacture of CRT devices for optimizing color purity including locating permanent magnets in or near the convergence yoke assembly, varying the direction of the magnets in a magnetic field equalizer assembly, and adjusting the deflecting yoke axially. Typically, when a CRT device is moved with respect to the direction of the earth's magnetic field, color purity must be readjusted. Various types of degaussing coils have been placed around the periphery of the face plate or around the conical portion of the CRT for demagnetizing portions of the CRT structure which become magnetized during use. In some devices, manual degaussing of a CRT device is a process to be performed by a service man. Many present day color CRT devices are designed to be degaussed automatically. Since the energizing of the degaussing coil would cause a noticeable flash on the phosphor screen, degaussing is usually done as the CRT device is turned on and before the electron beams are on. This mode of operation is usually satisfactory for apparatus in the home, such as television sets, but in industrial or business environments there may be relatively strong magnetic fields at times due to starting electric motors and the like which severely effect color purity. In some devices, the whole device is shut down manually when degaussing becomes necessary, but an unwanted shutdown may be less desirable than having some color impurity and generally causes loss of data in a data terminal.

SUMMARY OF THE INVENTION

It is, therefore, an object of the present invention to provide a means for automatic degaussing of a CRT.

It is a particular object to provide degaussing at suitable times with respect to the operation of the device.

It is another object of the present invention to provide the capability of software control of the degaussing process to allow for completely automatic control or semi-automatic control with user input.

These objects and others which will be apparent are obtained in a degaussing arrangement in accordance with the present invention by using a timer or software equivalent to detect a predetermined period of inactivity in the CRT device. The detect signal will enable a degaussing circuit to initiate the degaussing cycle. The end of the predetermined period will preferably coincide with or be slightly longer than a predetermined period which initiates "dimming" of the CRT screen, if automatic dimming is a feature of the device. The software program will continue to initiate degaussing at continued periods of inactivity subsequent to a degaussing cycle. The user may also desire to cause degaussing at some fixed clock time which is also possible within the scope of the present invention.

DETAILED DESCRIPTION OF THE PREFERRED EMBODIMENT

Figure 1:
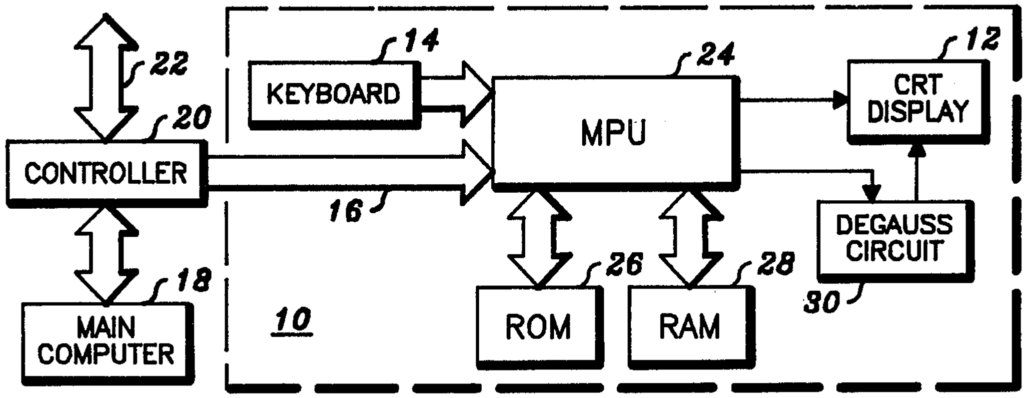
FIG. 1 is a block diagram of a data display terminal system.

In a CRT device 10 with which the present invention was designed to function, a CRT screen display 12 provides information in the form of alphanumeric characters or as graphic displays. The information may be inputted by a keyboard 14 at the CRT device or as by a data bus 16 from a main computer 18 via a controller 20. To avoid "burning in" of the pattern displayed on the screen, the device may include a timing circuit for "dimming" the screen when no information is inputted either from the keyboard or the data bus for a period of, for example, 20 minutes. The "dimming" could be a complete blanking out or turning off of the electron beams in the CRT, or a small area of the screen may remain illuminated to indicate that the device is in use. To restore brightness, the keyboard is activated, preferably by a designated key. In accordance with the present invention, it is recognized as desirable to also degauss the CRT during such an extended period of inactivity, and especially to degauss while the screen is "dimmed". Therefore, the logic signal which initiates the "dimming" could be utilized in the present invention, as will be described below.

Figure 2:
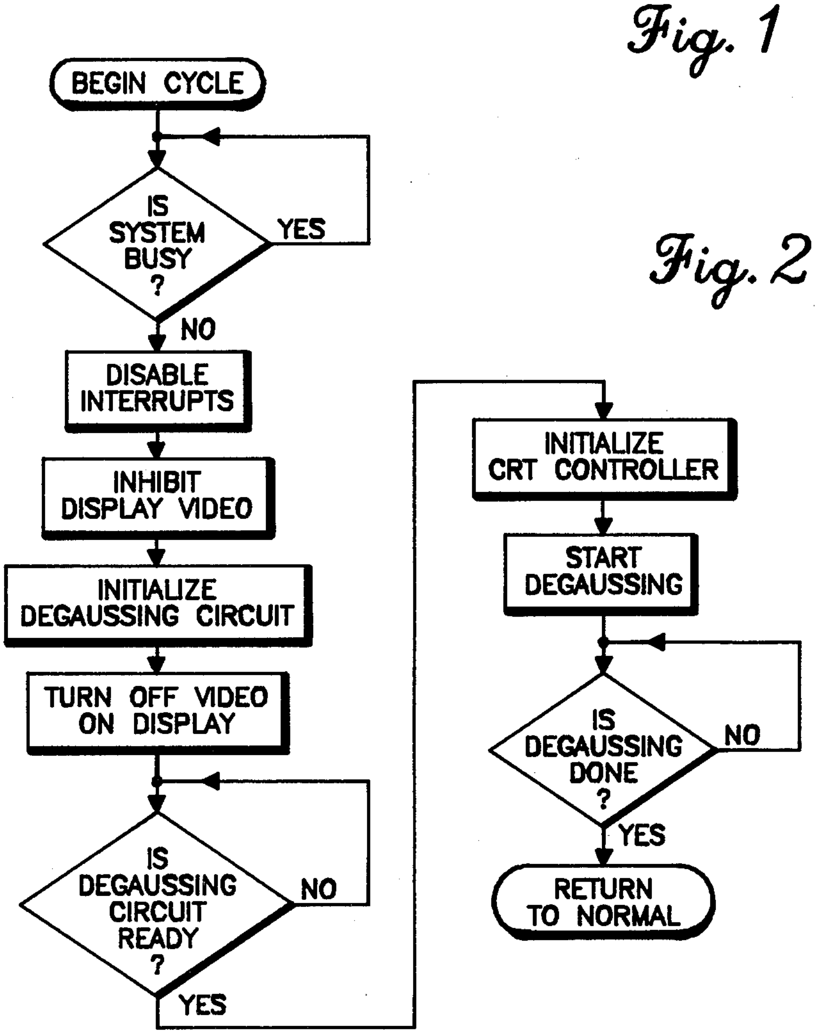
FIG. 2 is a flow chart for degaussing at turn-on or manual control.

The controller 20 may also be coupled to other terminals via other data buses such as the one designated 22. Information inputted by the keyboard 14 is coupled to a microprocessor 24 and associated memories 26, 28, then to the display 12. The microprocessor 24 will include a clocking device (not shown) for providing clock signals for various elements in the unit. Also included in the monitor 10 is a degaussing circuit 30 which is controlled from the microprocessor 24. The degaussing circuit 30 will preferably, but not necessarily, be the circuit shown and described in the above-referenced co-pending patent application. The subject degaussing circuit was designed for operation at any desired time without powering down the entire unit. The flow chart of FIG. 2 shows the degaussing method as used at power up or at manual reset. The program is also provided hereinbelow.

The first step for either automatic at power up or manual reset is to check for system activity. While the keyboard would not be inputting data at either power up or manual reset, it is possible that data might be coming in from the controller 20. If there is no activity present, further interrupts from either data input are prevented or disabled. Next, the CRT video is inhibited. In the preferred environment, a "dimming" circuit (not shown) using a flip flop or other timer causes the screen, or at least the data portions of the screen, to go "dim" or unilluminated and to remain so during extended periods of inactivity. At turn on, the screen will, naturally, be dark and will not be brightened until after degaussing is complete but the "dim" flip flop will be set at this time to initialize the degaussing circuit. The user's line (data input) is disabled and a timer (not shown) is set to allow a charge to build up in a capacitor in the degaussing circuit 30. The CRT is then initialized to provide power supply sync. The "dim" flip flop is then pulsed or reset to begin the degaussing process which will typically last 5-7 seconds. After the start of degaussing, the system waits approximately ten seconds for the monitor to warm up, checking to be sure that degaussing is complete. Thus, the potential visual effect of degaussing is not seen on the screen. Operation of the CRT device then returns to normal.

The programs given below are written in "AMD 2910 Bit Slice Tech." for use with a particular unit. However, in view of the included English language explanations and notation, it is believed that anyone skilled in the art will be able to practice the invention with any desired hardware combination.

DEGAUSS PROGRAM #1

```
;***************************************************************************
;**     AT POWER UP THE HARDWARE FORCES A JUMP ZERO          **
;**     COMMAND. THE STACK POINTER SHOULD BE POINT-          **
;**     ING TO THE FIRST OF FIVE REGISTERS USED FOR          **
;**     STACKING PURPOSES. IF ANY CALL TO SUBROUTINE         **
;**     INSTRUCTIONS ARE ADDED TO DEGAUSS, YOU MAY           **
;**     WANT TO POP THE STACK 5 TIMES TO INSURE YOU          **
;**     WILL HAVE 5 LEVELS OF NESTING AVAILABLE.             **
***************************************************************************
;
;THIS ROUTINE IS USED ONLY ONCE AT POWER UP
;TO PERFORM TWO FUNCTIONS:
;1)INITIALIZE DEGAUSSING OF THE MONITOR.
;2)WAIT FOR APPROX. 10 SECONDS TO ALLOW THE
;MONITOR TO WARM-UP BEFORE CONTROL IS PASSED
;TO THE RESET ROUTINE (STACK).
;
;INPUTS: NONE
;
;OUTPUTS: NONE
;
;REGISTERS USED:
;Q- USED FOR PULSING THE DIM FLIP-FLOP.
;SP4- USED TO SEND INHIBIT VIDEO TO THE FUNC REG.
;SP5- USED AS A LSB FOR THE WARM-UP COUNTER.
;SP6- USED AS A MSB FOR THE WARM-UP COUNTER.
;
;-1-
;WAIT FOR RECEIVER AND TRANSMITTER INTERRUPTS
;TO CLEAR THEN SET WRAP MODE FLIP-FLOP TO DIS-
;ABLE FURTHER INTERRUPTS.
DEGAUS JBZ,$
JXBZ,$
MVIQ,X.SWRAP
MOVQD,FUNC
;
;-2-
;INHIBIT THE CRT VIDEO AND READ THE KEYBOARD REG-
;ISTER TO SET THE "OFF" OUTPUT OF THE "DIM" FLIP-
;FLOP HIGH.
MVIR,SP4,X.INV
MOVRD,SP4,FUNC
MOVQS,KBRG
;
;-3-
;DISABLE THE USER'S LINE AND WAIT FOR APPROX. ½ SEC.
;FOR THE DEGAUSSING CAPACITOR TO FULLY CHARGE. INITIALIZE
;THE CRT IN ORDER THAT THE POWER SUPPLY CAN SYNC.
MVIQ,XDULINE
MOVQD,FUNC
CALL,WAIT4P5
CALL,INITCRT
;
;-4-
;PULSE THE "DIM" FLIP-FLOP AND CAUSE THE "OFF" OUTPUT
;TO GO LOW. THIS SIGNALS THE MONITOR TO BEGIN DEGAUS-
;SING.
MVIQ,X.SDIM
MOVQD,FUNC
MVIQ,X.RDIM
MOVQD,FUNC
;
;-5-
;WAIT FOR APPROX. 10 SECONDS FOR THE MONITOR TO WARM UP
;MAKING DEGAUSSING NON-VISIBLE.
CALL,WAIT410
;
;-6-
```

-continued

```
DEGAUSS PROGRAM #1
;GOTO THE NORMAL RESET ROUTINE.
JMP,STACK
;
;-7-
;WAIT FOR APPROX. ONE HALF SECOND
WAIT4P5 CLRQ
CLRR,SP5
CLRR,SP6
LOOP4P5 NOP
INR,SP5
JNC.LOOP4P5
INR,SP6
JNC,LOOP4P5
INQD,NOD
CMPIQ,ØlØH
JNZ,LOOP4P5
RET
EJECT
```

Figure 3:
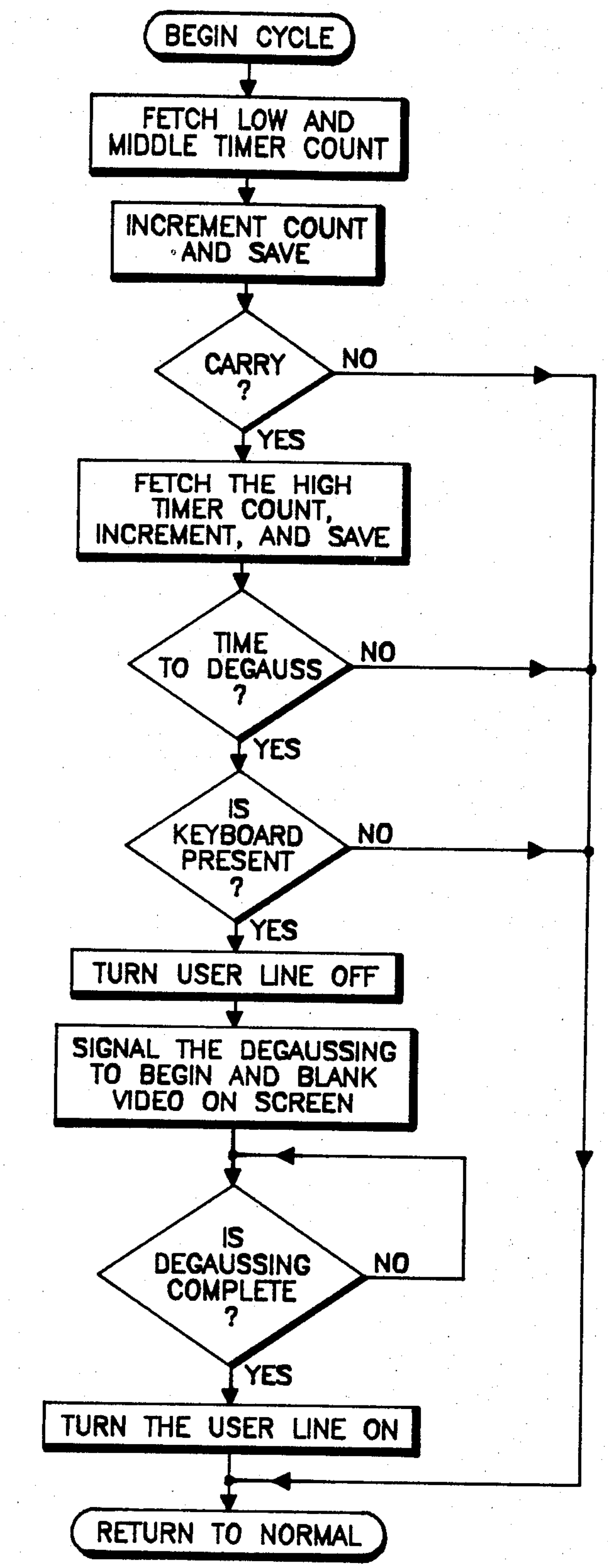
FIG. 3 is a flow chart for automatically controlled degaussing.

FIG. 3 is a flow chart illustrating the automatic degaussing operation. As noted above, the CRT device will be "dimmed" after 20 minutes of inactivity in order to avoid "burning in" of the screen. Data or graphics being displayed are restored at the touch of a key. Also, one portion of the screen is not used for user-entered data may remain illuminated at all times to indicate that the device is in use although inactive. The first few steps seen in the flow chart refer to "low and middle timer" and "high timer". In the present embodiment, these constitute the three separate RAM 28 memory locations of a 20 minute timer or counter register. Counts are stored in the timer register whenever no inputs are detected from either the keyboard 14 or the data bus 16. Until the timer, which is clocked by the clock in the microprocessor 24, indicates that 20 continuous minutes of inactivity (or any other preprogramed interval) have occurred, the CRT device continues to operate normally; that is, data can be received from either input and be displayed on the display 12. When the preprogramed interval ends, the presence or absence of a keyboard is determined.

References to "alarm counter", "alarm flag bit (FBS) register" and "alarm flip flop" should be ignored in the program as set forth below as they are not relevent to the degaussing operation. The portions of the program are here reproduced exactly as written, and therefore, include other program functions interleaved with degausssing. The program description also refers to "no keyboard=no dim" since the same program will be used in CRT devices without keyboards but having the automatic dimming feature and, therefore, the automatic degaussing is not used. In such units, degaussing will occur at turn-on and otherwise is accomplished by turning the power off and on again as described hereinabove. As now utilized, the CRT device depends on the user's touch of a key to restore brightness.

If a keyboard is present then, the "dim subroutine" is called for and dimming and degaussing procedures are executed. In principle, a subroutine is not required, but in practice, there may be advantages to having separate access to the routine; e.g. for testing the degaussing operation. As seen in the flow chart, the user line may be disabled before degaussing begins and enabled immediately after completion. At the end of the degaussing period, the display 12 is not automatically illuminated. The timer sequence will be repeated and the degaussing procedure repeated at the end of every 20 minutes of inactivity. It is also contemplated that, by using the time-of-day clock of the microprocessor, the user could program the CRT device to be automatically degaussed at set times.

```
DEGAUSSING PROGRAM #2
;******************************************************************************
;*THIS ROUTINE IS USED TO CONTROL THE SCREEN DIM AND
;* ALARM FLIP FLOPS, AND ALSO UPDATES THEIR APPROPRIATE
;* COUNTERS.
;*
;* ENTERING THE MLP7 Ø ROUTINE, THE SCREEN DIM
;* COUNTER IS READ FROM MEMORY AND STORED IN
;* WORKING REGISTERS TO BE UPDATED. THE SCREEN DIM
;* COUNTER IS STORED IN (SP1,SPØ).
;*
;* THE SCREEN DIM COUNTER IS THEN INCREMENTED BY ONE.
;* THE SCREEN DIM COUNTER IS NOW TESTED TO DETERMINE IF
;* APPROXIMATELY 20 MIN. OF INACTIVITY HAVE ELAPSED.
;* WHEN THIS CONDITION IS MET, THE SCREEN DIM FLIP FLOP
;* IS SET, DISABLING THE CRT SCREEN UNLESS NO KEYBOARD
;* IS ATTACHED. NO KEY-BOARD = NO DIM.
;* THE ALARM CONDITION IS NOW TESTED TO SEE IF THE ALARM
;* FLAG BIT IS SET IN THE FBS REGISTER. IF THE ALARM
;* FLAG IS SET, IT SETS THE ALARM FLIP FLOP IN THE FUNC
;* REGISTER, CLEARS THE FLAG IN THE FBS REGISTER, AND
;* SETS THE ALARM COUNTER TO Ø. NOW EACH TIME THROUGH
;* THIS ROUTINE, THE ALARM COUNTER IS INCREMENTED BY ONE
;* UNTIL IT REACHES A COUNT OF Ø8 HEX. AT THIS COUNT,
;* THE ALARM FLIP FLOP IS RESET IN THE FUNC REGISTER.
;*
```

-continued

DEGAUSSING PROGRAM #2

```
;* WHEN THESE TESTS ARE FINISHED BEING UPDATED, THE
;* NEW VALUES IN THE COUNTERS ARE WRITTEN BACK TO THE
;* SAME MEMORY LOCATIONS THEY WERE READ FROM.
;*
;* CALL,MLP7Ø        <(SDAH,SDAL),FBS>
;* GIVING            <(WSDAH,SDAL),FBS,FUNC>
;* USING             <(SP8,SP7),(SP1,SPØ),SP5>
;*
;* CALL,MLP71        <FBS>
;* USING             <SPØ,SP1,SP5,SP7,SP8>
;* GIVING            <FBS,FUNC>
;*****************************************************************************
;
INPUTS:
;
;SDAH,SDAL           A DOUBLE PRECISION DEFINED ADDRESS THAT
;.                   POINTS TO THE MEMORY LOCATION OF THE
;.                   SCREEN DIM COUNTER TO BE READ.
;
:FBS                 FLAGS,BASE,STATUS REGISTER THAT IS USED
;.                   FOR TESTING TO SEE IF THE ALARM STATUS
;.                   BIT IS SET.
;
;OUTPUTS:
;
;WSDAH,SDAL          A DOUBLE PRECISION DEFINED ADDRESS THAT
;.                   POINTS TO THE MEMORY LOCATION OF THE
;.                   SCREEN DIM COUNTER TO BE WRITTEN TO.
;
;FUNC                FUNCTION REGISTER WHICH IS USED TO SET OR
;.                   RESET THE ALARM FLIP FLOP.
;SCRATCH:
;
;SP8,SP7             A DOUBLE PRECISION ADDRESS REGISTER THAT
;.                   CONTAINS THE ADDRESS LOCATIONS OF THE
;.                   SCREEN DIM AND ALARM COUNTERS.
;
;SP1,SPØ,Q           A TRIPLE PRECISION REGISTER WHICH HOLDS
;.                   THE SCREEN DIM COUNTER FOR UPDATING
;
;SP5                 THIS REGISTER HOLDS THE ALARM COUNTER
;.                   FOR UPDATE.
;
;F.ALRM              ALARM FLAG
;
;X.ALRMZ             TEST BIT TO SET THE ALARM FLIP FLOP.
;
;X.RALRM             TEST BIT TO RESET ALARM FLIP FLOP.
;
;CONSTANTS USED:
;X.SDIM              USED TO SET THE DIM FLIP-FLOP
;
;X.RDIM              USED TO RESET THE DIM FLIP-FLOP
;
;EXTERNAL CALLS:
;
RWMEM                THIS ROUTINE READS AND WRITES THE
;.                   SCREEN DIM AND ALARM COUNTERS TO
;.                   AND FROM MEMORY.
;
;ENTRY POINT INTO THIS ROUTINE OTHER THAN MLP7Ø
;MLP71               ENTRY INTO THIS POINT CAUSES WORK
;                    TO BE DONE ON THE ALARM COUNTER
;                    ONLY AS DESCRIBED IN A PARAGRAPH 4
;                    AT THE BEGINNING OF THIS MODULE.
;*****************************************************************************
;START OF ROUTINE
;*****************************************************************************
;-1-
;GET THE BEGINNING MEMORY ADDRESS (SDAH, SDAL) THAT
;POINTS TO THE TRIPLE PRECISION SCREEN DIM COUNTER
;AND PUT THIS ADDRESS IN THE DOUBLE PRECISION
;REGISTER (SP8,SP7).
;
MLP7ØMVIR,SP8,SDAH            ;SET TO READ
MVIR,SP7,SDAL                 ;ADDRESS OF LOW CNTR

;
;-2-
;READ THE DOUBLE PRECISION SCREEN DIM COUNTER POINTED
;TO BY DOUBLE PRECISION ADDRESS REGISTER(SP8,SP7) AND
;STORE IN DOUBLE PRECISION REGISTER(SP1,SPØ).
```

-continued

DEGAUSSING PROGRAM #2

```
;
CALL,RWMEM
MOVQR,SPØ                  ;LOW BYTE TO SPØ
CALL,RWMEM
MOVQR,SP1                  ;HIGH BYTE TO SP1
;
;-5-
;INCREMENT THE PRECISION SCREEN DIM COUNTER.
;HAS THE SCREEN DIM COUNTER REACHED APPROX. 2Ø MIN.?
;YES, GO TO #6 AND SET THE SCREEN DIM FLIP FLOP.
;NO, GO TO #7 AND TEST FOR ALARM STATUS.
;
INR,SPØ                    ;BUMP SCREEN DIM COUNT
JNC,MLP71-1                ;LOW.
INR,SP1                    ;BUMP SCREEN DIM COUNT
JNC,MLP71-1                ;MIDDLE.
CALL,STORE                 ;SAVE PRESENT COUNT.
MVIR,SP8,SDAH              ;FETCH THE HIGH DIM
CALL,RWMEM                 ;COUNT.
MOVQR,SPØ
INR,SP+518                 ;BUNP SCREEN DIM COUNT
MOVRQ,SPØ                  ;HIGH.
MVIR,SP8,WSDAH             ;SAVE PRESENT COUNT.
MVIR,SP7,SDAL+2
CALL,RWMEM
CMPIR,SPØ,DIMCNT           ;20 MIN. ELAPSED?
JNZ,MLP71                  ;BRANCH IF NO.
;
;-6-
; TEST TO DETERMINE IF A KEYBOARD IS PRESENT.
; IF YES CALL DIM SUBROUTINE
; ELSE GOTO 7
;
MOVQS,IDWD                 ;IS A KB PRESENT?
ANIQ,ØFHØ                  ;DO NOT DIM IF NO KB.
CMPIQ,ØFHØ
JMPZ,MLP71
CALL,DIMTST                ;DIM AND DEGAUSS IF
JMP,MLP71                  ;PRESENT.
CALL,STORE                 ;SAVE PRESENT DIM COUNT
;
;-7-
;IS THE ALARM FLAG SET IN THE FBS REGISTER?
;YES, GO TO #1Ø AND TURN ON THE ALARM FLIP FLOP IN
;"FUNC".
;NO, GO TO #12 AND IF THE ALARM HAS BEEN SET, SEE
;IF IT IS TIME TO TURN IT OFF.
;
MLP71,MVIR,SP8,ALARMH      ;FETCH ALARM COUNT.
MVIR,SP7,ALARML
CALL,RWMEM
MOVQR,SPØ
INR,SPØ                    ;INC. ALARM COUNT
TEST,FBS,F.ALRM            ;ALARM FLAG?
JMPZ,MLP72                 ;NO IF BRANCH
;
```

Thus there has been shown and described a degaussing system for a CRT device wherein the system monitors the activity in the device and, when a predetermined period of inactivity has been detected, the CRT is dimmed and then degaussed. The CRT remains dim until the keyboard is activated or data is received, but the CRT will be degaussed at the end of every 20 minutes of continued inactivity. Other variations and modifications are possible and it is intended to cover all such as fall within the spirit and scope of the appended claims.

What is claimed is:

1. A logic controlled degaussing system for a CRT device and comprising:

detector means for detecting signal activity in the device;

timing means coupled to the detector means for providing an output signal in response to a predetermined period of inactivity; and a degaussing circuit for degaussing the CRT in response to the timing means output signal.

2. A logic controlled degaussing system according to claim 1 and wherein the timing means provides an output signal in response to each predetermined period of activity immediately subsequent to each first said predetermined period.

3. A logic controlled degaussing system according to claim 1 and further including a dimming circuit for reducing substantially the CRT brightness of at least a portion of the CRT screen in response to the timing means output signal, the degaussing circuit being enabled while the CRT brightness is reduced.

4. A logic controlled degaussing system according to claim 3 and wherein the CRT device includes a keyboard for inputting data and wherein the dimming circuit is disabled by activation of the keyboard.

5. A logic controlled degaussing system according to claim 1 and wherein the degaussing circuit is adapted to function without powering down the CRT device and to be disabled at the end of each degaussing cycle.

6. A logic controlled degaussing system according to claim 1 and further including means for enabling the degaussing circuit at device turn-on.

7. A logic controlled degaussing system according to claim 1 and further means for manually enabling the degaussing circuit.

8. A logic controlled degaussing system according to claim 3 and further including means for manually enabling the dimming circuit and the degaussing circuit.

9. A method of degaussing a CRT in a CRT device and comprising the steps of:

detecting signal activity in the CRT device;

providing an output signal in response to a predetermined period of inactivity;

degaussing the CRT in response to the output signal.

10. The method of claim 9 and further including the step of reducing substantially the brightness of at least a portion of the CRT screen in response to the output signal and wherein the degaussing step occurs while the brightness is reduced.

11. The method of claim 10 and wherein the previous steps are repeated as long as inactivity in the device continues.

* * * * *